(12) United States Patent
Takemura et al.

(10) Patent No.: US 8,159,558 B2
(45) Date of Patent: Apr. 17, 2012

(54) IMAGE PROCESSING CIRCUIT, SEMICONDUCTOR DEVICE AND IMAGE PROCESSING DEVICE

(75) Inventors: Tetsuya Takemura, Kyoto (JP); Kazuma Mishima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 713 days.

(21) Appl. No.: 12/302,518

(22) PCT Filed: Jun. 1, 2007

(86) PCT No.: PCT/JP2007/061174
§ 371 (c)(1),
(2), (4) Date: Nov. 26, 2008

(87) PCT Pub. No.: WO2007/142134
PCT Pub. Date: Dec. 13, 2007

(65) Prior Publication Data
US 2009/0284625 A1    Nov. 19, 2009

(30) Foreign Application Priority Data

Jun. 2, 2006 (JP) ................................ 2006-155139
Oct. 30, 2006 (JP) ................................ 2006-293546
Nov. 17, 2006 (JP) ................................ 2006-310983
Nov. 17, 2006 (JP) ................................ 2006-310987

(51) Int. Cl.
*H04N 5/235* (2006.01)
(52) U.S. Cl. .................. 348/229.1; 348/222.1; 348/234
(58) Field of Classification Search ............... 348/222.1, 348/230.1, 254–256, 229.1, 362
See application file for complete search history.

(56) References Cited

U.S. PATENT DOCUMENTS

| 5,517,333 | A  | * | 5/1996  | Tamura et al. ................ 358/518 |
| 6,351,558 | B1 |   | 2/2002  | Kuwata |
| 6,628,830 | B1 |   | 9/2003  | Yamazoe et al. |
| 6,650,774 | B1 |   | 11/2003 | Szeliski |
| 6,694,051 | B1 |   | 2/2004  | Yamazoe et al. |
| 7,302,110 | B2 |   | 11/2007 | Chesnokov |
| 7,986,355 | B2 | * | 7/2011  | Nozawa ........................ 348/254 |
| 2007/0071318 | A1 | | 3/2007 | Yamashita et al. |

FOREIGN PATENT DOCUMENTS

| EP | 1 515 274 | 3/2005 |
| JP | 04-340886 | 11/1992 |
| JP | 06-036024 A | 2/1994 |
| JP | 07-038801 | 2/1995 |
| JP | 08-046925 | 2/1996 |
| JP | 08-154246 | 6/1996 |
| JP | 10-198802 | 7/1998 |
| JP | 10-210323 | 8/1998 |

(Continued)

*Primary Examiner* — Tuan Ho
(74) *Attorney, Agent, or Firm* — Fish & Richardson P.C.

(57) ABSTRACT

According to one aspect of the present invention, there is provided an image processing device that performs brightness conversion processing according to a brightness conversion coefficient on each pixel of an input image and produces an output image. The image processing device includes a division section dividing the region of the input image into a plurality of areas and a histogram calculation section calculating a histogram for each area. Here, the brightness conversion coefficient is determined based on the result of calculation by the histogram calculation section. With this configuration, it is possible to obtain, even when there is a portion of an image having a brightness level (or a brightness range) of low frequency in terms of an entire image, satisfactory contrast for the entire image including such a portion.

20 Claims, 14 Drawing Sheets

FOREIGN PATENT DOCUMENTS

| | | |
|---|---|---|
| JP | 2000-013625 | 1/2000 |
| JP | 2000-036043 | 2/2000 |
| JP | 2000-184359 | 6/2000 |
| JP | 2001-069518 A | 3/2001 |
| JP | 2001-167281 | 6/2001 |
| JP | 2001-268400 | 9/2001 |
| JP | 2003-116139 | 4/2003 |
| JP | 2003-153036 | 5/2003 |
| JP | 2004-145399 | 5/2004 |
| JP | 2004-530368 | 9/2004 |
| JP | 2005-130486 | 5/2005 |
| WO | 2005/027041 | 3/2005 |

* cited by examiner

☐ :PIXELS TO BE COUNTED
▧ :PIXELS NOT TO BE COUNTED

☐ : AREA HAVING PREDETERMINED NUMBER OF PIXELS
▨ : AREA HAVING INSUFFICIENT NUMBER OF PIXLES
⌐ ⌐ : PART HAVING MISSING PIXELS

IMAGE PROCESSING CIRCUIT, SEMICONDUCTOR DEVICE AND IMAGE PROCESSING DEVICE

TECHNICAL FIELD

The present invention relates to an image processing circuit that performs brightness conversion processing (brightness dynamic range correction processing) on an input image to generate a desired output image, a semiconductor device formed by integrating such an image processing circuit and an image processing device incorporating such a semiconductor device.

The invention also relates to an image processing circuit that detects whether or not any movement (change) of the input image of each frame of moving images is produced, a semiconductor device formed by integrating such an image processing circuit and a monitoring device incorporating such a semiconductor device.

BACKGROUND ART

Conventionally, as one type of image processing for making an input image appear more beautiful, brightness conversion processing is commonly used. In such brightness conversion processing, brightness conversion is performed by calculating, for example, based on a brightness histogram for an entire image, a brightness conversion coefficient common to the entire image region and multiplying each pixel by the brightness conversion coefficient.

Specifically, the brightness histogram (frequencies in brightness ranges, that is, the distribution of the number of pixels falling within each predetermined brightness range) for the entire input image is first generated. Then, the brightness conversion coefficient is calculated based on this brightness histogram such that brightness ranges with higher frequencies in the input image are made wider in an output image, and in contrast, brightness ranges with lower frequencies in the input image are made narrower in the output image. Thus, the brightness conversion coefficient is different in each brightness level or each predetermined brightness range.

Thus, although portions of the input image in a brightness range of lower frequency have a lower contrast (brightness difference), portions of the input image in a brightness range of higher frequency have a higher contrast. Hence, it is possible to achieve a higher contrast than that of the input image in terms of an entire image.

Conventional technologies related to the foregoing are disclosed in patent documents 1 to 4 and other documents.

Image processing devices are disclosed and proposed in patent documents 5 and 6 that perform predetermined reduction processing on data of an input image and generate a brightness histogram.

An image signal movement detection circuit is disclosed and proposed in patent document 7. The image signal movement detection circuit has threshold processing means that compares a frame difference signal of an input image signal with a threshold to output the result of the comparison as a movement detection signal and means for detecting the average brightness of an entire screen on image signals (or means that divides image signals into a plurality of blocks to detect the average brightness on a block-by-block basis), and is configured such that the threshold of the threshold processing means is appropriately switched based on the output of the means for detecting the average brightness.

Patent document 1: JP-T-2004-530368
Patent document 2: JP-A-2000-013625
Patent document 3: JP-A-2000-036043
Patent document 4: JP-A-2004-145399
Patent document 5: JP-A-H10-198802
Patent document 6: JP-A-2001-268400
Patent document 7: JP-A-H08-046925

DISCLOSURE OF THE INVENTION

Problems to be Solved by the Invention

As described previously, according to the method of calculating, from a brightness histogram of an entire image, a brightness conversion coefficient common to an entire image, portions of the image in a brightness range of low frequency uniformly have low contrast. Even in portions of an image in a brightness range of low frequency, however, satisfactory contrast (higher contrast) may be required. In this case, it is difficult to satisfy such a requirement by performing the conventional brightness conversion processing described previously.

One example is that although most of an image has low brightness, high-brightness pixels are concentrated in a part of the image, and this portion is very important for the image.

In this case, although such a portion is required to have higher contrast, since it falls within a brightness range of low frequency in terms of an entire image, a narrower range is assigned in an output image to such a portion. This makes it difficult to obtain satisfactory contrast.

Since the conventional image processing device described previously performs acquisition processing (counting processing) on a brightness histogram for an entire input image when brightness dynamic range correction processing is performed, as the size of the input image (the number of pixels) is increased, a counter is required to have a larger bit width. This contributes to an increase in the size of a circuit.

With the previously described conventional movement detection circuit disclosed in patent document 7, it is possible to generate, when movement detection is performed based on a frame difference signal, a movement detection signal of high accuracy not only for an image in which brightness changes with time in terms of an entire image but also for an image in which portions of different brightness exist on a single screen.

Since the above-described conventional movement detection circuit detects a difference between the entire current frame and the entire preceding frame, and performs, based on the result of a comparison between the absolute value of the difference and a predetermined threshold, movement detection processing, it is suitable for applications such as one in which image quality is enhanced by performing movement detection on constantly changing television image signals or the like and performing movement adaptation processing for switching signal processing between moving images and still images through control of the detected movement detection signals. The conventional movement detection circuit, however, is not suitable for detection of the movement of a part of a frame. For example, it is not necessarily suitable for applications such as a monitoring camera that is required to reliably detect a minute movement of a suspicious individual and record an input image.

Since the above-described conventional movement detection circuit performs the movement detection processing based on a frame difference signal, it is necessary to buffer at least image signals of one frame, and when the size of an image is large, a large-capacity frame memory is required. This may increase the size of a circuit and cost.

The above-described conventional movement detection circuit in which average brightness on an image signal (or block-by-block average brightness) is detected is disclosed and proposed. This configuration is adopted as means for preventing reduction in movement detection accuracy attributable to changes in screen brightness so as to control the threshold of threshold processing means. The object and effects of this configuration are different from those of the present invention.

An object of the present invention is to provide an image processing circuit that can provide, even when there is a portion of an image having a brightness level (or a brightness range) of low frequency in terms of an entire image, satisfactory contrast for the image including such a portion, a semiconductor device formed by integrating such an image processing circuit and an image processing device incorporating such a semiconductor device.

Another object of the invention is to provide an image processing circuit that can perform brightness conversion processing on an input image while reducing an increase in the size of a circuit, and enhance the quality and visibility of an output image, a semiconductor device formed by integrating such an image processing circuit and an image processing device incorporating such a semiconductor device.

Another object of the invention is to provide an image processing circuit that can not only detect a minute movement of a part of a frame with high accuracy but also help reduce the size of a circuit, a semiconductor device formed by integrating such an image processing circuit and an image processing device incorporating such a semiconductor device.

Means for Solving the Problem

To achieve the above object, according to one aspect of the present invention, there is provided an image processing circuit that performs brightness conversion processing according to a brightness conversion coefficient on each pixel of an input image and produces an output image. The image processing circuit has a division section dividing the region of the input image into a plurality of areas and a histogram calculation section calculating a histogram for each area. Here, the brightness conversion coefficient is determined based on the result of calculation by the histogram calculation section (the first configuration).

Specifically, the image processing device may further include a first calculation section calculating an area-by-area conversion coefficient for each area based on the result of calculation by the histogram calculation section. Here, the brightness conversion coefficient may be determined based on the area-by-area conversion coefficient (the second configuration).

With this configuration, the brightness conversion coefficient is determined based on the histogram for each area. Thus, even when there is a portion of an entire image that has a larger difference in brightness than the entire image, the brightness conversion is performed on the portion according to the brightness conversion coefficient determined based on the histogram of the area including the portion. Consequently, satisfactory contrast can be obtained for the portion as compared with, for example, a case where the brightness conversion is determined based on the histogram for the entire image.

The "brightness conversion coefficient" and the "area-by-area conversion coefficient" determine the relationship between the brightness of an input image and an output image. For example, they are given as a ratio between the brightness of the output and input images, determined for the brightness of each input image. This does not limit the invention.

In the second configuration, a filter section may be included that low-pass filters the area-by-area conversion coefficient in terms of images and locations (the third configuration).

The area-by-area conversion coefficient is calculated based on the histogram for the area of interest and is basically calculated without any consideration given to brightness information for areas outside the area of interest. Thus, at the boundary between the areas, the brightness difference may be noticeable. With this configuration where the area-by-area conversion coefficient is low-pass filtered in terms of images and locations, it is possible to reduce such brightness difference.

In the third configuration, the filter section may be configured such that when the filtering is performed on an area of interest, the area-by-area conversion coefficient of an area included in a predetermined range around the area of interest is used, and when at least part of the predetermined range is located outside the region of the image, a predetermined imaginary coefficient is assigned to the part and the filtering is performed by regarding the imaginary coefficient as the area-by-area conversion coefficient (the fourth configuration).

With this configuration, it is possible to perform satisfactory filter processing by regarding an imaginary coefficient assigned to a part located outside the region of an image as an area-by-area conversion coefficient, even when the filtering processing is performed on an area located around the perimeter of the region of the image. The "the imaginary coefficient" takes the same form as that of area-by-area conversion coefficient so as to achieve the object.

The image processing device of any one of the second to fourth configurations may further include a second calculation section calculating a pixel-by-pixel conversion coefficient for each pixel based on the area-by-area conversion coefficient, the second calculation section calculating the pixel-by-pixel conversion coefficient so as to further reduce the difference of brightness of a boundary between the areas. Here, the brightness conversion coefficient may be determined based on the pixel-by-pixel conversion coefficient (the fifth configuration).

Since the area-by-area conversion coefficient is set constant for each area (the area-by-area conversion coefficient is common to pixels within the area), the difference of brightness of the boundary between the areas may still be noticeable. In this configuration, the pixel-by-pixel conversion coefficient is calculated based on the area-by-area conversion coefficient such that the difference of brightness of the boundary between the areas is further reduced. The brightness conversion coefficient is determined based on the pixel-by-pixel conversion coefficient, and this makes it easy to produce an image where the difference of brightness is further reduced.

Like the "brightness conversion coefficient" and the "area-by-area conversion coefficient", the "pixel-by-pixel conversion coefficient" determine the relationship between the brightness of an input image and an output image. For example, it is given as a ratio between the brightness of the output and input images, determined for the brightness of each input image. This does not limit the invention.

The image processing device of any one of the second to fifth configurations may further include the second calculation section calculating the pixel-by-pixel conversion coefficient for each pixel based on the area-by-area conversion coefficient. Here, the brightness conversion coefficient may be determined based on the pixel-by-pixel conversion coefficient, and the second calculation section may select, when calculating a pixel-by-pixel conversion coefficient of the pixel of interest, four areas in the vicinity of the pixel of interest and perform a bilinear computation on four points located at approximate centers of the four areas (the sixth configuration).

With this configuration, the pixel-by-pixel conversion coefficient is calculated based on the area-by-area conversion coefficient such that the brightness of areas including the boundary varies smoothly. Thus, it is possible to minimize discontinuous change of brightness. This helps produce more beautiful images.

The term "four areas in the vicinity of the pixel of interest" refers to four areas sharing one vertex thereof, as shown in FIG. 7, and having relationship in which the pixel of interest is located inside a quadrilateral formed by drawing lines between the approximate centers of the areas.

In any one of the first to sixth configurations, each frame of moving images may be picked up as the input image, and the brightness conversion processing for the nth frame may be performed according to the brightness conversion coefficient determined based on the contents of the (n−1)th frame (the seventh configuration).

Since in this configuration, the brightness conversion processing for the nth frame is performed by use of the brightness conversion coefficient for the (n−1)th frame, it is possible to perform the brightness conversion on the nth frame and produce an image output before the calculation of the brightness conversion coefficient for the nth frame is completed. This makes it possible to quickly produce an image obtained by performing brightness conversion processing on an input image. This helps produce an image output in almost real time.

The image processing device of any one of the first to seventh configurations may further include an image pickup section forming an optical image of a subject to pick up the image of the subject. Here, the input image may be obtained by picking up the image (the eighth configuration). With this configuration, it is possible to pick up the image of a subject while obtaining benefits of any one of the above-described configurations.

In the image processing circuit of the first configuration, all pixels included in each area may be subjected to predetermined reduction processing and then remaining pixels may be counted for the brightness histogram, and a resulting count value except for a few lower-order bits may be stored in an internal memory (the ninth configuration). With this configuration, it is possible to reduce the sizes of a counter and an internal memory. This makes it possible to perform the brightness conversion processing on an input image while reducing an increase in the size of a circuit, and increase the image quality and visibility of an output image.

In the image processing circuit of the ninth configuration, the reduction processing may be performed such that pixels that are eliminated and pixels that are not eliminated are arranged in a staggered manner (the tenth configuration). With this configuration, it is possible to minimize reduction in accuracy of a brightness histogram caused by the reduction processing.

In the image processing circuit of the first configuration, when an area that has less pixels than a predetermined number of pixels is produced at the time of division of the input image into areas, missing brightness information may be supplemented with brightness information of the pixels included in the area and thus a brightness histogram of the area may be acquired (the eleventh configuration). With such area supplement processing, the number of population (the total number of pixels) is equal in all the areas. Thus, it is possible to perform processing in the succeeding stage with only one piece of hardware. This helps reduce the size of a circuit. When the area supplement processing is performed, the brightness information of the pixels included in the area is used. Thus, it is possible to acquire a brightness histogram for the area. This helps minimize effects on the brightness conversion processing.

In the image processing circuit of the eleventh configuration, when in the area having less pixels than the predetermined number of pixels, the number of missing pixels is less than that of pixels included in the area, a required number of pixels, among the pixels included in the area, that are closer to the pixel region to be supplemented may be extracted and missing information may be supplemented with the extracted brightness information (the twelfth configuration). With this configuration, it is possible to acquire a brightness histogram for the area as compared with a case where the brightness information of pixels located away from the pixel region to be supplemented is used or a case where the brightness information of randomly extracted pixels is used. This helps minimize effects on the brightness conversion processing.

The image processing circuit of the first configuration may further include a movement detection section that acquires brightness information of each of a plurality of areas into which an input image of one frame is divided, and compares the brightness information of a current frame and a preceding frame to detect whether or not any movement of the input image is produced (the thirteenth configuration). With this configuration, it is possible to detect a minute movement of a part of a frame with high accuracy as compared with a conventional method in which movement detection processing is performed based on a frame difference signal.

In the image processing circuit of the thirteenth configuration, the movement detection section may use a brightness value of the pixel of interest included in each area as the brightness information (the fourteen configuration). With this configuration, it is possible to reduce the amount of buffered data when the brightness information of the current and preceding frames is compared and evaluated. This helps reduce the size of a circuit.

In the image processing circuit of the fourteenth configuration, the movement detection section may perform a predetermined weight computation on brightness values between the pixel of interest and pixels adjacent thereto in the current frame or on brightness values between the pixels of interest in the current and preceding frames, and use the result of the computation as the brightness value of the pixel of interest included in each area (the fifteenth configuration). With this configuration, it is possible to increase noise resistance and reduce erroneous detection since the effects of instantaneous brightness change of the pixel of interest are less likely to be suffered.

In the image processing circuit of the thirteenth configuration, the movement detection section may use a brightness histogram for each area as the brightness information (the sixteenth configuration). With this configuration, it is possible to reduce the amount of buffered data when the brightness information between the current and preceding frames is compared and evaluated. This helps reduce the size of a circuit. Moreover, since the effects of noise are less likely to be suffered, it is possible to perform the movement detection of each area with high accuracy.

The image processing device of any one of the thirteen to sixteenth configurations may further include: a brightness conversion coefficient calculation section that acquires a brightness histogram for each of a plurality of areas into which an input image of one frame is divided, and calculates a brightness conversion coefficient based on the brightness histogram; and a brightness conversion processing section performing brightness conversion processing according to the brightness conversion coefficient on each pixel of the input image. Here, the movement detection section may use brightness information of each area acquired when the brightness conversion coefficient is calculated, and perform movement detection processing on the input image (the seventeenth configuration). With this configuration, it is possible to obtain, even when there is a portion of an image having a brightness level (or a brightness range) of low frequency in terms of an entire image, satisfactory contrast for the entire image including such a portion. This makes it possible to increase the image quality and visibility of an output image. With this configuration, it is also possible to simultaneously acquire the brightness information that is required for both the brightness conversion processing and the movement detection processing. This makes it possible to avoid the duplication of a circuit, and this helps reduce the size of the circuit.

According to another aspect of the present invention, there is provided a semiconductor device that is formed by integrating the image processing circuit of any one of the first to seventeenth configurations (the eighteenth configuration).

According to another aspect of the invention, there is provided an image processing device including; the semiconductor device of the eighteenth configuration; and an image pickup section forming an optical image of a subject to pick up the image of the subject. Here, the input image is obtained by picking up the image (the nineteenth configuration). With this configuration, it is possible to pick up the image of a subject while obtaining benefits of any one of the above-described configurations.

The image processing device of the nineteenth configuration may further include a recording section recording the input image when any movement of the input image is detected (the twentieth configuration). With this configuration, it is possible to save storage space in a recording medium without the recorded image being highly compressed (hence, without degradation in the quality of the recorded image).

ADVANTAGES OF THE INVENTION

As described above, with an image processing circuit of the present invention, a brightness conversion coefficient is determined based on a brightness histogram calculated for each area. Thus, even when there is a portion of an image having brightness difference larger than that of an entire image, brightness conversion is performed on the portion according to the brightness conversion coefficient determined based on the brightness histogram for the area including the portion. Consequently, satisfactory contrast can be obtained for the portion as compared with, for example, a case where a brightness conversion coefficient is determined based on a histogram for an entire image.

With an image processing circuit of the present invention, a semiconductor device formed by integrating such an image processing circuit or an image processing device incorporating such a semiconductor device, it is possible to perform brightness conversion processing on an input image while reducing an increase in the size of a circuit, and increase the image quality and visibility of an output image.

With an image processing circuit of the invention, since the number of population is equal in all the areas, it is possible to perform processing in the succeeding stage with only one piece of hardware. This helps reduce the size of a circuit.

When area supplement processing is performed, the brightness information of the pixels included in the area is used. Thus, it is possible to acquire a brightness histogram for the area. This helps minimize effects on the brightness conversion processing.

With an image processing circuit of the invention, a semiconductor device formed by integrating such an image processing circuit or an image processing device incorporating such a semiconductor device, it is possible to detect a minute movement of a part of a frame with high accuracy as compared with a conventional method in which movement detection processing is performed based on a frame difference signal.

LIST OF REFERENCE SYMBOLS

Figure 1:
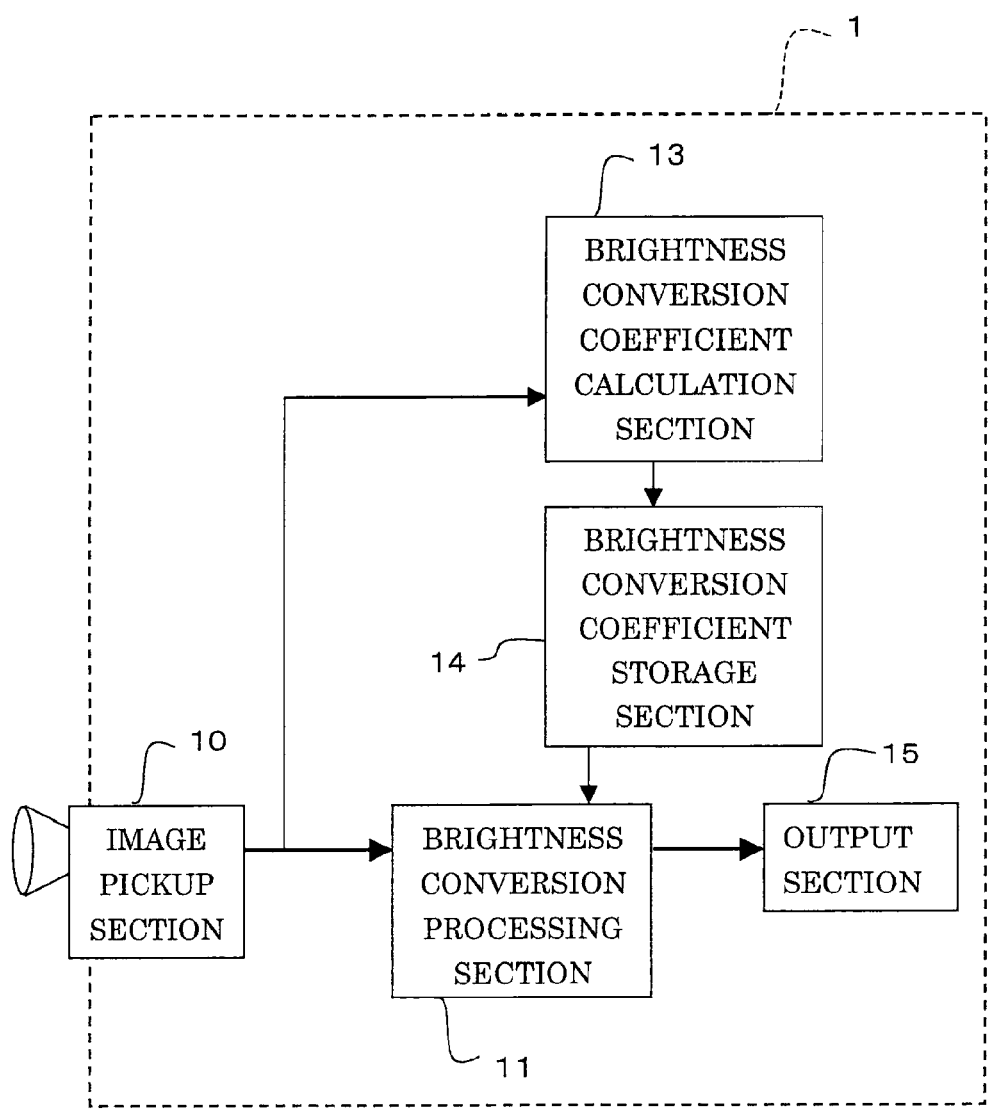
FIG. 1 A block diagram showing an image processing device according to an embodiment of the present invention.

1 Image processing device
1' Monitoring device (an example of the application of the image processing device)
10 Image pickup section (image pickup means)
11 Brightness conversion processing section
13 Brightness conversion coefficient calculation section 14 Brightness conversion coefficient storage section
15 Output section
16 & 16' Movement detection section
17 Recording section
131 Reduction processing section
132 Counter section
133 Round-down processing section
134 Internal memory section
161 Pixel-of-interest extraction section
162 Noise filter processing section
163 Buffer section
164 Comparison determination section

BEST MODE FOR CARRYING OUT THE INVENTION

Hereinafter, a detailed description will be given of a case where the present invention is applied to an image processing device that performs brightness conversion processing on an image of each frame obtained by capturing moving images.

The configuration of an image processing device according to the invention will first be schematically described in detail.

FIG. 1 is a block diagram showing the image processing device according to an embodiment of the invention As shown in the figure, the image processing device 1 of this embodiment has an image pickup section 10, a brightness conversion processing section 11, a brightness conversion coefficient calculation section 13, a brightness conversion coefficient storage section 14 and an output section 15.

The image pickup section 10 has a predetermined lens, an image pickup element (a CMOS sensor or a CCD sensor) and the like; it performs image-capturing processing (for example, for capturing 30 frames of moving images per second) on a subject by forming an optical image of the subject. The image data of each frame is sequentially fed to the brightness conversion processing section 11 and the brightness conversion coefficient calculation section 13.

The brightness conversion processing section 11 performs brightness conversion processing on the image data (input image) of each frame fed from the image pickup section 10, and produces an output. Such brightness conversion processing is performed by varying the brightness of each pixel of the input image according to a brightness conversion coefficient stored in the brightness conversion coefficient storage section 14.

The brightness conversion coefficient calculation section 13 calculates, according to the image data (input image) of each frame fed from the image pickup section 10, the brightness conversion coefficient for use in the brightness conversion processing. The content of the brightness conversion coefficient and a method for calculating the brightness conversion coefficient will be described later.

The brightness conversion coefficient storage section 14 stores the brightness conversion coefficient calculated by the brightness conversion coefficient calculation section 13 at least until the brightness conversion processing is performed on the succeeding frame. The stored brightness conversion coefficient is used in the brightness conversion processing performed by the brightness conversion processing section 11.

The output section 15 has a display such as a LCD (liquid crystal display); it sequentially displays images that are fed after being subjected to the brightness conversion processing performed by the brightness conversion processing section 11.

The image processing device 1 configured as described above performs, based on the brightness conversion coefficient, the brightness conversion processing on input images obtained by capturing moving images, and displays the resulting images on the display.

Of the above-described components, the brightness conversion processing section 11, the brightness conversion coefficient calculation section 13 and the brightness conversion coefficient storage section 14 are preferably integrated into a semiconductor device.

The overall flow of the image processing performed by the image processing device 1 will now be described with reference to FIG. 2.

Figure 2:
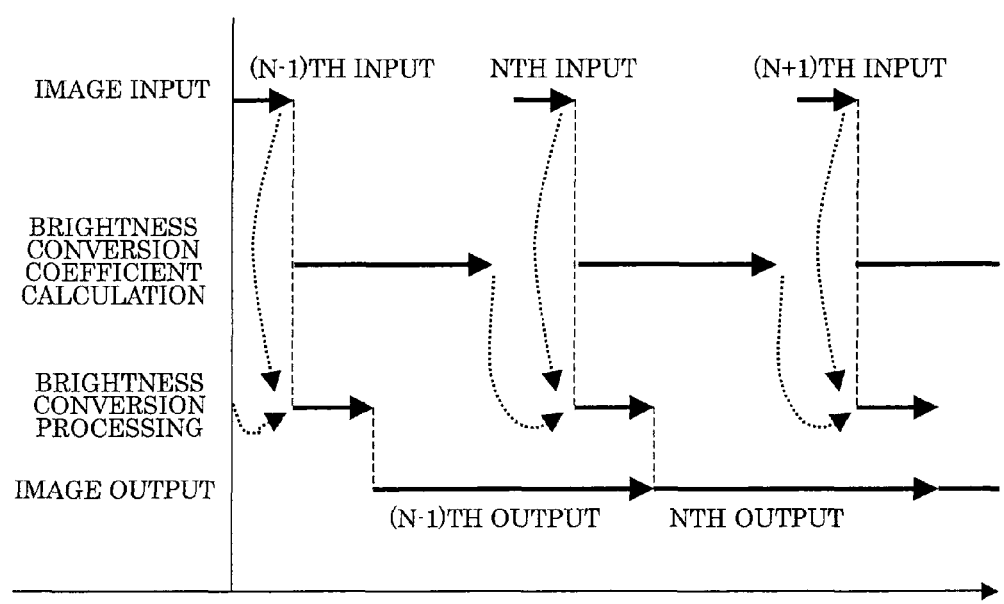
FIG. 2 A diagram for describing the overall flow of image processing.

FIG. 2 is a diagram for describing the overall flow of the image processing performed by the image processing device 1.

As shown in the figure, when the input image of the nth frame is received, the brightness conversion coefficient calculation section 13 calculates a brightness conversion coefficient based on the input image. Thus, the brightness conversion coefficient determined based on the nth frame is obtained, and it is temporarily stored in the brightness conversion coefficient storage section 14.

The brightness conversion processing section 11 performs brightness conversion processing on the received input image of the nth frame by use of a brightness conversion coefficient determined based on the (n−1)th frame that has already been stored in the brightness conversion coefficient storage section 14.

Specifically, let the brightness of a pixel located at coordinates (i, j) of the nth frame that is not subjected to the brightness conversion processing be $Iij(n)$, the brightness that has been subjected to the brightness conversion processing be $Oij(n)$, and a brightness conversion coefficient determined, based on the (n−1)th frame, for the pixel located at the coordinates (i,j) be $Tij(n-1)$. Then, the brightness of pixels of each frame is varied based on equation (1) below. The image that has been subjected to the brightness conversion processing performed by the brightness conversion processing section 11 is fed through the output section 15.

$$Oij(n)=Tij(n-1)th \times Iij(n) \tag{1}$$

As described above, the image processing device 1 of this embodiment performs brightness conversion processing on the input image of the nth frame by use of the brightness conversion coefficient determined based on the (n−1)th frame. Thus, before the calculation of the nth brightness conversion coefficient is completed, the image processing device 1 can perform the nth brightness conversion processing and produce an image output. This makes it possible to produce, as quickly as possible, an image obtained by performing brightness conversion processing on an input image. This helps produce an image output in almost real time.

It may be possible to perform brightness conversion processing on the input image of the nth frame by use of a brightness conversion coefficient determined based on the (n−2)th frame or an earlier frame. It should be noted that when a brightness conversion coefficient based on a quite old frame is used, conversion processing is performed with insufficient accuracy. Such a problem is particularly noticeable when fast-moving images are handled. When, for example, a still image is used as an input image, brightness conversion processing may be performed on the input image of the nth frame by use of the brightness conversion coefficient determined based on the nth frame.

The method of calculating the brightness conversion coefficient will now be described with reference to a flowchart shown in FIG. 3.

Figure 3:
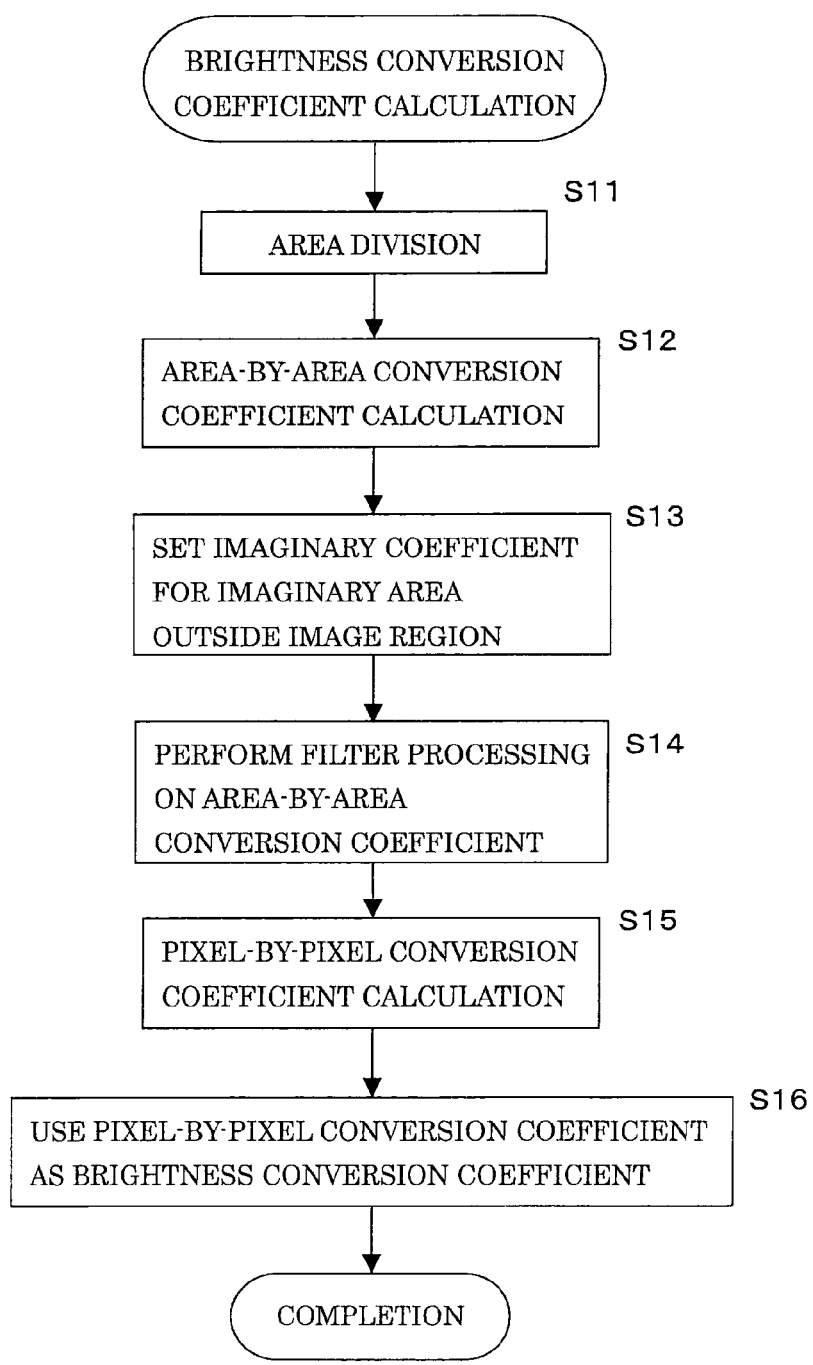
FIG. 3 A flowchart for describing the method of calculating a brightness conversion coefficient.

FIG. 3 is the flowchart for describing the method of calculating the brightness conversion coefficient in the image processing device 1.

The input image of one frame is divided into areas (step S11).

Figure 4:
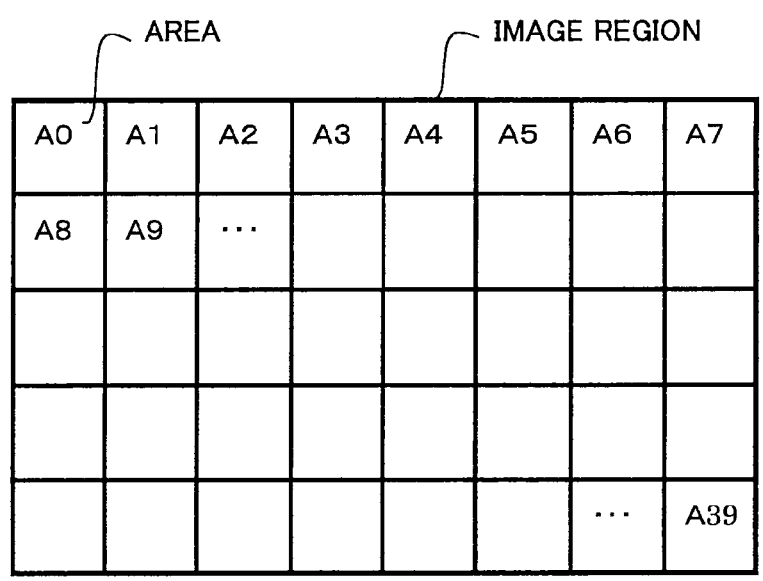
FIG. 4 A diagram for describing one aspect of area division in the image processing device 1.

FIG. 4 is a diagram for describing one aspect of the area division in the image processing device 1.

In the example of FIG. 4, one frame is composed of 40 vertical pixels by 64 horizontal pixels (=2560 pixels), and one area is 8 by 8 pixels in size. Thus, the total number of areas is 40 (5 vertical areas×8 horizontal areas=40 areas). The areas are respectively referred to as "A0, A1. An . . . A39", starting at the area in the upper left corner.

After the completion of the area division, area-by-area conversion coefficients are then calculated (step S12 in FIG. 3). The area-by-area conversion coefficient is determined for each area, and thus the area-by-area conversion coefficient is common to pixels within one area.

Since the method of calculating the area-by-area conversion coefficient is the same as the method of calculating the conversion coefficient for an entire frame, its detailed description is omitted. The method of calculating the area-by-area conversion coefficient differs from the conventional method in that instead of a brightness histogram for an entire frame, an area-by-area brightness histogram (the frequency of pixels in each brightness level or in each brightness area) is generated, and then the conversion coefficient is calculated based on the area-by-area brightness histogram. With the area-by-area conversion coefficient thus calculated, brightness ranges of each divided area with higher frequencies in an input image are made wider in an output image.

In step S12 shown in FIG. 3, area-by-area conversion coefficients are calculated for all the areas within the image region. That is, the area-by-area conversion coefficient is uniquely determined for each area. The brightness conversion processing may be performed on the input image by adopting, as brightness conversion coefficients, the area-by-area conversion coefficients as they are. In this way, even if there is a portion of an entire image that has a larger difference in brightness than the entire image, satisfactory contrast can be obtained in the entire image including the portion.

The area-by-area conversion coefficient is basically calculated without any consideration given to brightness information on areas outside the area of interest, that is, on the other areas. Thus, at the boundary between the areas, its brightness difference is noticeable (the distribution of brightness is of high frequency), and an unsatisfactory image in terms of smoothness may be produced. To overcome this problem, in this embodiment, filter processing or the like is performed on an area-by-area conversion coefficient calculated for each area. This processing will be described specifically.

Before the filter processing or the like is performed, imaginary areas similar in size to the above-mentioned areas are set up outside the image region.

Figure 5:
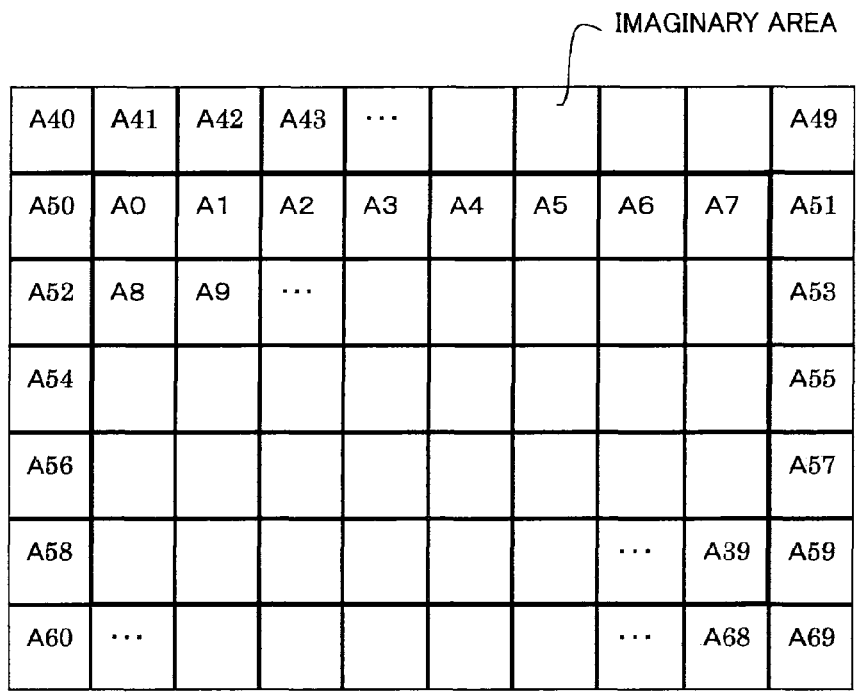
FIG. 5 A diagram for describing the state in which imaginary areas (indicated by reference numerals A40 to A69 in the figure) are set up.

FIG. 5 is a diagram for describing the state in which the imaginary areas (indicated by reference numerals A40 to A69 in the figure) are set up.

Imaginary area-by-area conversion coefficients (hereinafter called "imaginary coefficients") are set for these imaginary areas A40 to A69 (step S13 in FIG. 13). These imaginary coefficients are set so that, as described later, the filter processing can be successfully performed even on areas around the perimeter of the image region.

The imaginary coefficient is set by reference to the area-by-area conversion coefficient of an area that is located symmetrically with an imaginary area with respect to an area (an area located in the perimeter of the image region) adjacent to the imaginary area. For example, the imaginary area A41 is located symmetrically with the area A8 with respect to the area A0, and thus the imaginary coefficient of the imaginary area A41 is set equal to the area-by-area conversion coefficient of the area A8. Likewise, the imaginary area A42 is located symmetrically with the area A9 with respect to the area A1, and thus the imaginary coefficient of the imaginary area A42 is set equal to the area-by-area conversion coefficient of the area A9. In contrast, the imaginary area A40 located in a corner is located symmetrically with the area A9 with respect to the area A0, and thus the imaginary coefficient of the imaginary area A40 is set equal to the area-by-area conversion coefficient of the area A9.

Instead of the above-described method of setting the imaginary coefficient, for examples, the imaginary coefficient may be set by reference to areas that are located symmetrically with respect to the perimeter (heavy lines shown in FIG. 6) of the image region. In this case, the imaginary area A41 is located symmetrically with the area A0 with respect to the perimeter of the image region, and thus the imaginary coefficient of the imaginary area A40 is set equal to the area-by-area conversion coefficient of the area A0. Likewise, the imaginary area A42 is located symmetrically with the area A1 with respect to the perimeter of the image region, and thus the imaginary coefficient of the imaginary area A42 is set equal to the area-by-area conversion coefficient of the area A1. In contrast, the imaginary area A40 located in a corner is located symmetrically with the area A0 with respect to the perimeter of the image region, and thus the imaginary coefficient of the imaginary area A40 is set equal to the area-by-area conversion coefficient of the area A0.

After the imaginary coefficient for each imaginary area is set as described above, low-pass filter processing (filter processing) is performed on the area-by-area conversion coefficient of each area within the image region in terms of images and locations (step S14 in FIG. 3).

Figure 6:
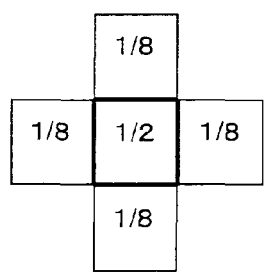
FIG. 6 A diagram for describing one aspect of a low-pass filter.

FIG. 6 is a diagram for describing one aspect of a low-pass filter.

When the filter processing is performed on the area of interest, the area-by-area conversion coefficients of areas (in this case, four areas located on the left, right, top and bottom of the area of interest) included in a predetermined range around the area of interest are used. When part of the predetermined range is located outside the image region, the area-by-area conversion coefficient of such part is assumed to be an imaginary coefficient assigned to the imaginary area of such part.

For example, the area-by-area conversion coefficient a'(0) of the area A0 that has been subjected to the filter processing is given by the following equation where a(n) represents the area-by-area conversion coefficients of the areas An (n=0, 1, 8, 41 and 50) that is not subjected to the filter processing and a(41) and a(50) represent the imaginary coefficients of the imaginary areas A41 and A50, respectively.

$$a'(0)=a(0)/2+\{a(1)+a(8)+a(41)+a(50)\}/8$$

With such filter processing, even when the difference of brightness of the boundary between areas is noticeable, the brightness difference can be reduced. Although this embodiment deals with, as a low-pass filter, the one shown in FIG. 7, many variations are possible in terms of, for example, within what range area-by-area conversion coefficients are considered in areas and what weights are assigned to areas when filtering is performed.

The brightness conversion processing may be performed on an input image by adopting, without being further processed, the area-by-area conversion coefficients that have been subjected to the filter processing, as brightness conversion coefficients. In this embodiment, however, in order to further obtain the smoothness of an output image, pixel-by-pixel conversion coefficients determined on a pixel-by-pixel basis (such coefficients are not necessarily the same even if pixels are located in the same area) are calculated (step S15 in FIG. 3), and they are adopted as brightness conversion coefficients (step S16 in FIG. 3).

The method of calculating this pixel-by-pixel conversion coefficient (bilinear computation) will now be described with reference to FIG. 7.

Figure 7:
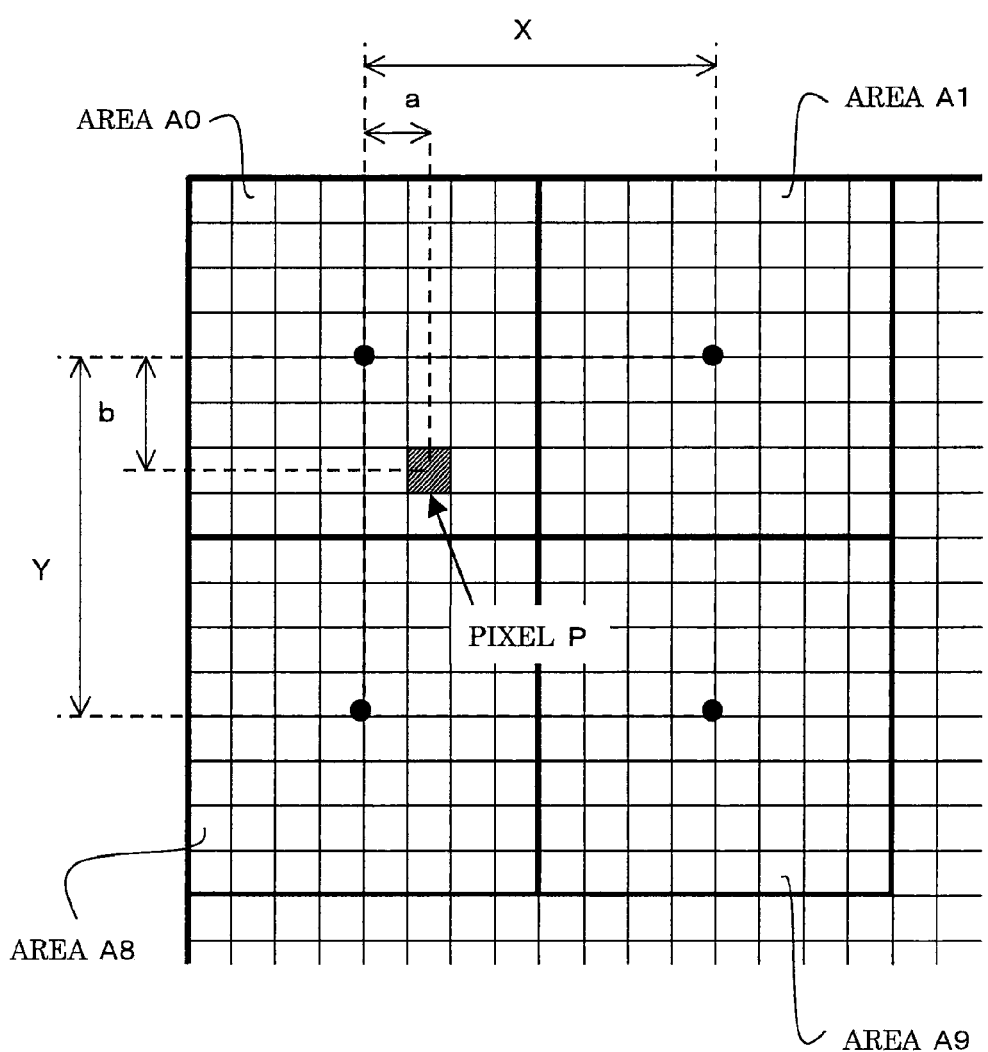
FIG. 7 A diagram for describing a bilinear computation.

FIG. 7 is a diagram for describing the bilinear computation.

When the pixel-by-pixel conversion coefficient of a pixel of interest is determined, consider four areas in the vicinity of the pixel of interest. For example, if a pixel P shown in FIG. 7 is the pixel of interest, consider areas A0, A1, A8 and A9. Specifically, the four areas are selected such that the four areas share one vertex thereof and the pixel of interest is located inside a quadrilateral formed by drawing lines between the centers of the areas.

The pixel-by-pixel conversion coefficient of the pixel of interest P is calculated by performing a bilinear computation on the area-by-area conversion coefficients {a'(0), a'(1), a'(8) and a'(9)} of the four areas that have been subjected to the filter processing, the position of the pixel of interest P and the center positions of the four areas.

Specifically, as shown in FIG. 7, let a horizontal area-to-area distance be X, a vertical area-to-area distance be Y, a horizontal distance between the center of the area A0 and the pixel of interest P be "a" and a vertical distance therebetween be "b", and then the pixel-by-pixel conversion coefficient p(P) of the pixel of interest P is given by the following equation.

$$p(P) = \left\{ \begin{array}{l} a'(o) \times (X-a) \times (Y-b) + \\ a'(1) \times a \times (Y-b) + \\ a'(8) \times (X-a) \times b + \\ a'(9) \times a \times b \end{array} \right\} / (X \times Y)$$

In the bilinear computation, when the pixel of interest is located around the perimeter of the image region, part of the four areas of interest may be located outside the image region. Even in this case, as in the previously described filter processing, the bilinear computation can be successfully performed such as by setting up imaginary areas and imaginary coefficients.

In this way, the pixel-by-pixel conversion coefficients of all the pixels within the image region are calculated and are used as the brightness conversion coefficients for the pixels. Thus, the pixel-by-pixel conversion coefficients are calculated based on the area-by-area conversion coefficients such that the brightness of the areas including the boundary therebetween varies smoothly. Consequently, it is possible to minimize discontinuous change of brightness. This helps produce more beautiful images.

When the bilinear computation is performed as described above, the pixel-by-pixel conversion coefficients are usually calculated such that the difference of brightness of the boundary between areas is further reduced. In order to reliably minimize the difference of brightness of the boundary between areas, another computation method may be used instead of or in addition to the bilinear computation.

Alternatively, it is possible to store only area-by-area conversion coefficients (area-by-area coefficients) in the brightness conversion coefficient storage section 14 and calculate, when the brightness conversion processing is performed, pixel-by-pixel conversion coefficients (pixel-by-pixel coefficients) that are finally adopted as brightness conversion coefficients. In this way, it is possible to reduce the amount of memory included in the brightness conversion coefficient storage section 14 as compared with the case where the pixel-by-pixel conversion coefficients are stored.

The above-mentioned term "pixel" may literally refer to "a single pixel" and may also refer to "a group of pixels" that is composed of, for example, red, green and blue (RGB) pixels. In the latter case, the term "brightness of a pixel" refers to, for example, the average of brightness of a group of pixels.

As described above, with the image processing device 1 of this embodiment, it is possible to obtain, even when there is a portion of an image having a brightness level (or a brightness range) of low frequency in terms of an entire image, satisfactory contrast for the entire image including such a portion.

Since the image processing device 1 of this embodiment performs acquisition processing (counting processing) not on a brightness histogram for an entire input image but on a brightness histogram for each area when brightness dynamic range correction processing is performed, it is unnecessary to unduly increase the number of bits counted by a counter (the maximum count number) even when the size of an input image (the number of pixels) is large. This makes it possible to significantly reduce the size of a circuit. Even when an input image having a large number of pixels is handled, it is unnecessary to increase the size of a circuit. Hence, it is possible to easily handle input images having a larger number of pixels.

In order to further reduce the size of a circuit, an example of the configuration of a brightness histogram calculation section included in the brightness conversion coefficient calculation section 13 will be proposed below, and its configuration and operation will be described in detail below.

Figure 8:
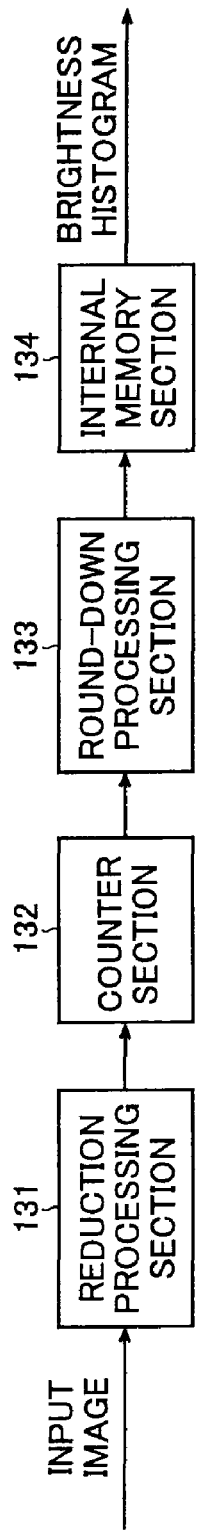
FIG. 8 A block diagram showing an example of the configuration of brightness histogram calculation section.

FIG. 8 is a block diagram showing the example of the configuration of the brightness histogram calculation section.

As shown in the figure, the brightness histogram calculation section of this configuration has a reduction processing section 131, a counter section 132, a round-down processing section 133 and an internal memory section 134.

The reduction processing section 131 performs predetermined reduction processing on an input image divided into areas; all the pixels included in each area are classified into pixels that are counted for a brightness histogram (pixels that are not eliminated) and pixels that are not counted for the brightness histogram (pixels that are eliminated).

Figure 9:
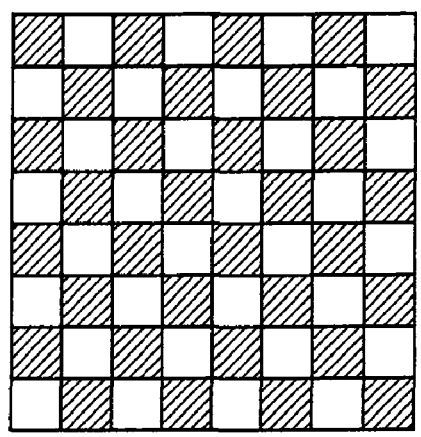
FIG. 9 A diagram for describing reduction processing performed when a brightness histogram is acquired.

FIG. 9 is a diagram for describing the reduction processing performed when a brightness histogram is acquired.

As shown in the figure, the reduction processing is performed such that the pixels that are not eliminated (shown as hatched pixels) and the pixels that are eliminated (shown as open pixels) are arranged in a staggered manner. With this configuration, it is possible to minimize reduction in accuracy of a brightness histogram caused by the reduction processing.

The method for performing reduction processing is not limited to such a method. Odd-numbered pixels (or even-numbers pixels) may be simply eliminated or pixels may be eliminated in units of columns (or in units of rows). The rate at which pixels are eliminated is not limited to 50 percent; more pixels may be eliminated or fewer pixels may be eliminated.

The counter section 132 divides pixels that are counted for a brightness histogram on a predetermined-brightness-range-by-a-predetermined-brightness-range basis, and counts the number of pixels included in each division (each brightness range). Here, the number of bits counted by the counter section 132 is reduced by one half (in a case where the reduction rate is 50%) as compared with the previously described case where the pixels in the entire area are counted.

The round-down processing section 133 performs predetermined round-down processing on a count value in each brightness division obtained by the counter section 132, and the count value except for a few lower-order bits is stored in the internal memory section 134. In a case, for example, where a counter value obtained by the counter section 132 is 7 bits long, the counter value except for the four lower-order bits, that is, the three higher-order bits is only stored in the internal memory section 134. That is, the round-down processing section 133 rounds down a fraction of the counter value. With this configuration, it is possible to reduce the capacity of the internal memory section 134. This helps reduce the size of a circuit.

The internal memory section 134 temporarily stores the count value obtained by the round-down processing section 133, and the stored data is used, as a brightness histogram, for calculating a brightness conversion coefficient.

As described above, with the brightness histogram calculation section of this configuration, all the pixels included in each area are subjected to the predetermined round-down processing and then the remaining pixels are counted for a brightness histogram, and the count value except for a few lower-order bits is stored in the internal memory section 134. With this configuration, it is possible to reduce the sizes of the counter section 132 and the internal memory 134. This makes it possible to perform brightness conversion processing on an input image while reducing an increase in the size of a circuit, and enhance the image quality and visibility of an output image.

When the image processing device 1 of this embodiment performs dynamic range correction processing, an input image is divided into predetermined-sized areas as described above. Depending on the sizes of the input image and the areas, the input image cannot be divided into a plurality of equal areas, with the result that the remainder of the input image is produced.

Figure 10:
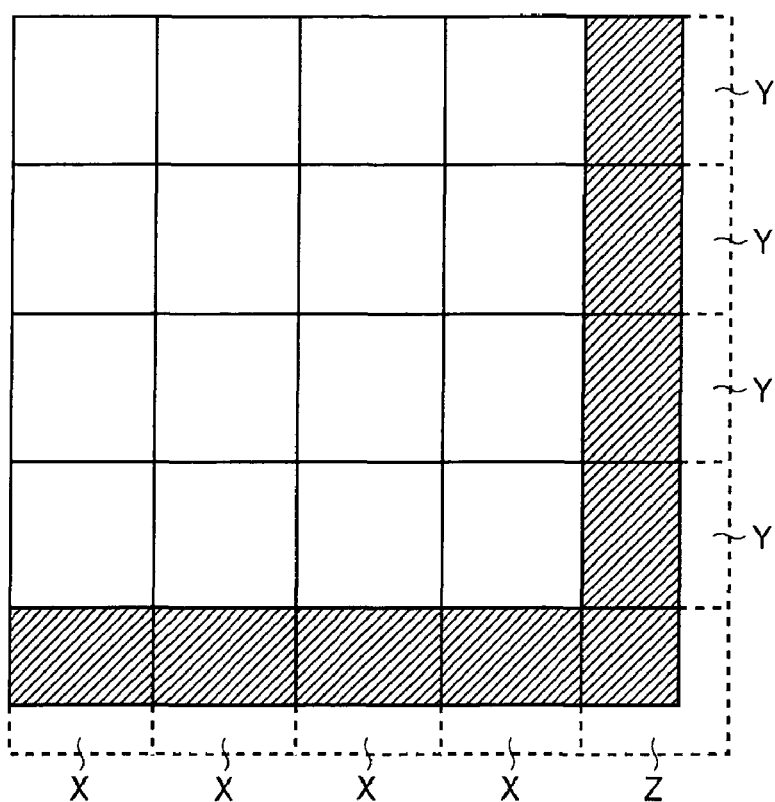
FIG. 10 A diagram for describing the state in which a remainder is produced when area division is performed.

FIG. 10 is a diagram for describing the state in which a remainder is produced when the area division is performed. In the figure, open areas represent areas that have a sufficient number of pixels, and hatched areas represent areas (areas X, Y and Z located in the edge of an input image) that have an insufficient number of pixels. Portions indicated by broken lines represent portions where pixels are missing.

As shown in the figure, when the areas X, Y and Z that have less pixels than a predetermined number are produced at the time of division of an input image into areas, the total number of pixels included in each area varies. Thus, a piece of hardware for performing processing (in the previous example, the processing for calculating the area-by-area brightness conversion coefficients) in the succeeding stage is required for each area (for each of the total number of pixels), and this increases the size of a circuit.

To overcome this problem, when areas that have less pixels than a predetermined number are produced at the time of division of an input image into areas, the image processing device 1 of this embodiment supplements missing brightness information with the brightness information of the pixels included in the areas to acquire the brightness histograms of the areas.

Figure 11A:
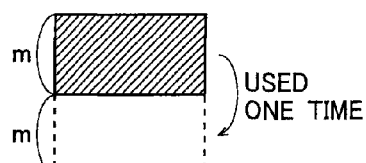
FIG. 11A A diagram for describing an example of area supplement processing.
Figure 11B:
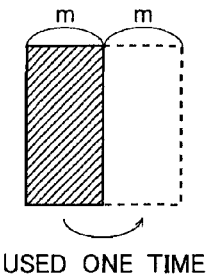
FIG. 11B A diagram for describing another example of area supplement processing.
Figure 11C:
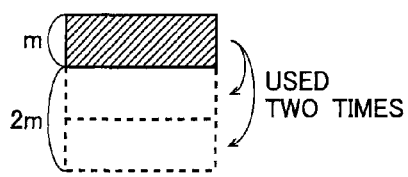
FIG. 11C A diagram for describing another example of area supplement processing.
Figure 11D:
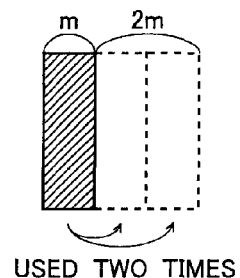
FIG. 11D A diagram for describing another example of area supplement processing.
Figure 11E:
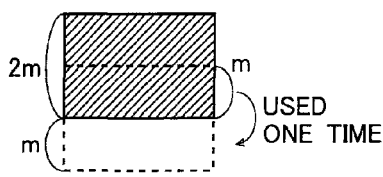
FIG. 11E A diagram for describing another example of area supplement processing.
Figure 11F:
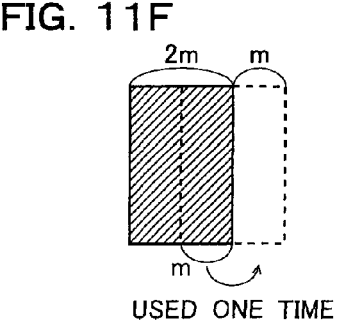
FIG. 11F A diagram for describing another example of area supplement processing.
Figure 11G:
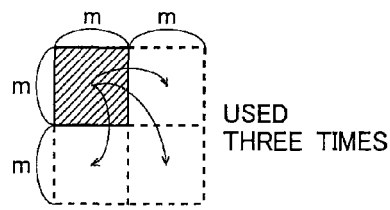
FIG. 11G A diagram for describing another example of area supplement processing.

FIGS. 11A to 11G are diagrams for describing examples of area supplement processing. FIGS. 11A, 11C and 11E show area supplement processing for areas (the areas X shown in FIG. 10) located at the bottom edge of a frame; FIGS. 11B, 11D and 11F show area supplement processing for areas (the areas Y shown in FIG. 10) located at the right edge of the frame. FIG. 11G shows area supplement processing for an area (the area Z shown in FIG. 10) located at the lower right corner of the frame. In FIGS. 11A to 11G, the hatched portions represent areas that have less pixels than a predetermined number, and portions indicated by broken lines represent portions where pixels are missing As shown in FIGS. 11A and 11B, when in an area having less pixels than a predetermined number, the number of pixels included in the area is equal to that of missing pixels, the missing information is preferably supplemented with the brightness information obtained by repeatedly sampling the brightness information of all the pixels included in the area. With such area supplement processing, the number of population (the total number of pixels) is equal in all the areas. Thus, it is possible to perform processing in the succeeding stage with only one piece of hardware. This helps reduce the size of a circuit. When the area supplement processing is performed, the brightness information of the pixels included in the area is used. Thus, it is possible to acquire a brightness histogram for the area. This helps minimize effects on the brightness conversion processing.

As shown in FIGS. 11C and 11D, when the portions where pixels are missing fail to be supplemented by performing the sampling once, the sampling is preferably performed a plurality of times.

As shown in FIGS. 11E and 11F, when in an area having less pixels than a predetermined number, the number of missing pixels is less than that of pixels included in the area, it is preferable to extract, among the pixels included in the area, a required number of pixels that are closer to the pixel region to be supplemented and supplement the missing information with the extracted brightness information. With this configuration, it is possible to acquire a brightness histogram for the area as compared with a case where the brightness information of pixels located away from the pixel region to be supplemented is used or the brightness information of randomly extracted pixels is used. This helps minimize effects on the brightness conversion processing.

As shown in FIG. 11G, when pixels are insufficient in row and column directions, it is preferable to repeat, as in the method described above, the sampling of the pixels included in the area an appropriate number of times and supplement the missing information with the obtained brightness information.

The area supplement processing described above is just one example, and any other method may be used as long as when an area having less pixels than a predetermined number is produced at the time of division of an input image into areas, missing brightness information can be supplemented with the brightness information of the pixels included in the area.

Although the embodiment described above deals with a case where the present invention is applied to the image processing device that performs brightness conversion processing on an image of each frame obtained by capturing moving images, the invention is not limited to this application. The invention can be applied to an image processing circuit that performs brightness conversion processing on an input image to generate a desired output image, a semiconductor device formed by integrating such an image processing circuit and image processing devices in general incorporating such a semiconductor device, including an image processing device that performs brightness conversion processing on a still image.

Many modifications and variations are possible without departing from the spirit of the present invention.

A detailed description will now be given of a case where the invention is applied to a monitoring device (an example of application of an image processing device) that performs movement detection processing and brightness conversion processing on an image of each frame obtained by capturing moving images.

The configuration of the monitoring device according to the present invention will first be schematically described in detail.

Figure 12:
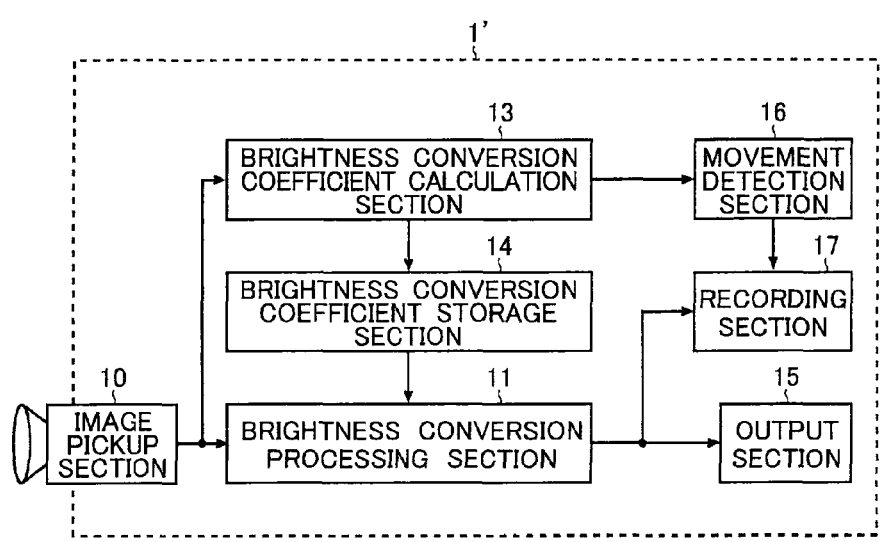
FIG. 12 A block diagram schematically showing the configuration of a monitoring device of the present invention.

FIG. 12 is a block diagram schematically showing the configuration of the monitoring device of the invention.

The monitoring device 1' of the invention is configured substantially similar to the image processing device 1 described previously. The same components as those of the image processing device 1 are identified with the same reference numerals as those of FIG. 1, and their description will not be repeated. Unique components of the monitoring device 1' of this embodiment will only be specifically described below.

As shown in the figure, the monitoring device 1' of this embodiment has an image pickup section 10, a brightness conversion processing section 11, a brightness conversion coefficient calculation section 13, a brightness conversion coefficient storage section 14 and an output section 15, and further has a movement detection section 16 and a recording section 17.

The movement detection section 16 uses the brightness information of each area acquired when the brightness conversion coefficient is calculated, and compares the brightness information of the current and preceding frames to detect whether or not any movement (change) of the input image of each frame is produced. The configuration and operation of the movement detection section 16 will be described in detail later.

The recording section 17 records an input image when finding any movement (change) of the input image based on a signal detected by the movement detection section 16. Thus, it is possible to save storage space in a recording medium without the recorded image being highly compressed (hence, without degradation in the quality of the recorded image).

As described above, the monitoring device 1' configured as described above performs, based on a brightness conversion coefficient, brightness conversion processing on an input image obtained by capturing moving images and displays the resulting image, and also records it as necessary.

Of the above-described components, the brightness conversion processing section 11, the brightness conversion coefficient calculation section 13, the brightness conversion coefficient storage section 14 and the movement detection section 16 are preferably integrated into a semiconductor device.

The configuration and operation of the movement detection section 16 will now be described in detail.

Figure 13:
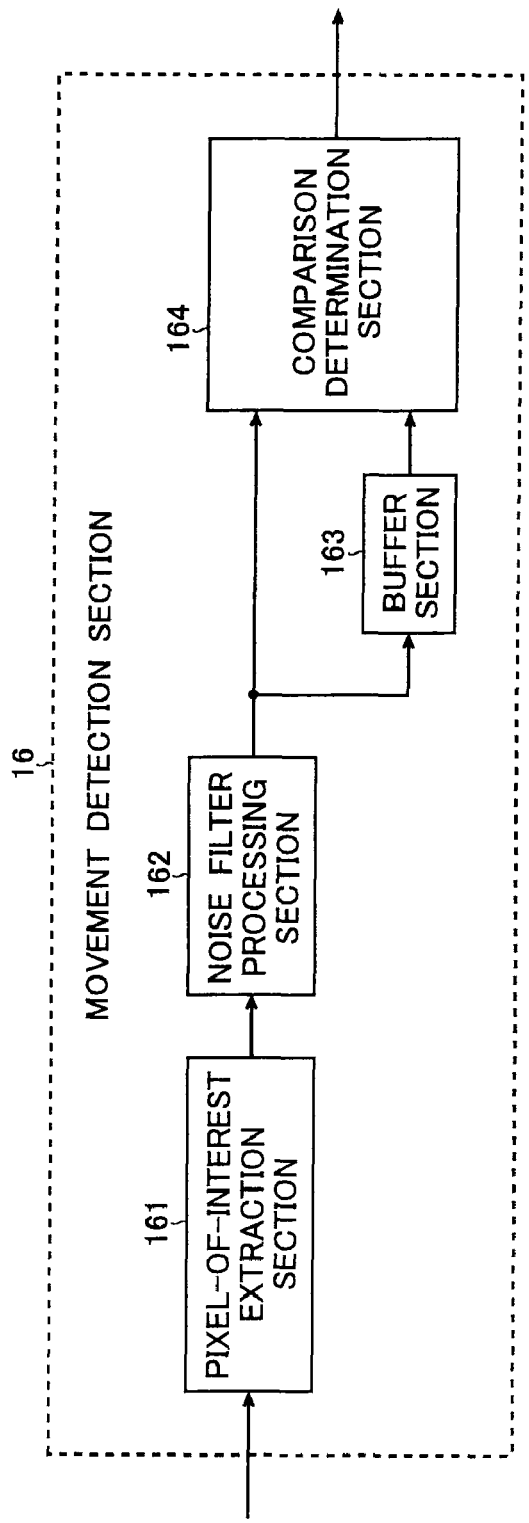
FIG. 13 A block diagram showing an example of the configuration of a movement detection section 16.

FIG. 13 is a block diagram showing an example of the configuration of the movement detection section 16.

As shown in the figure, the movement detection section 16 of this configuration has a pixel-of-interest extraction section 161, a noise filter processing section 162, a buffer section 163 and a comparison determination section 164.

The pixel-of-interest extraction section 161 derives, from the brightness conversion coefficient calculation section 13, the brightness value of each pixel acquired when a brightness conversion coefficient is calculated, and extracts the brightness values of a predetermined pixel of interest and its adjacent pixels on an area-by-area basis.

Figure 14:
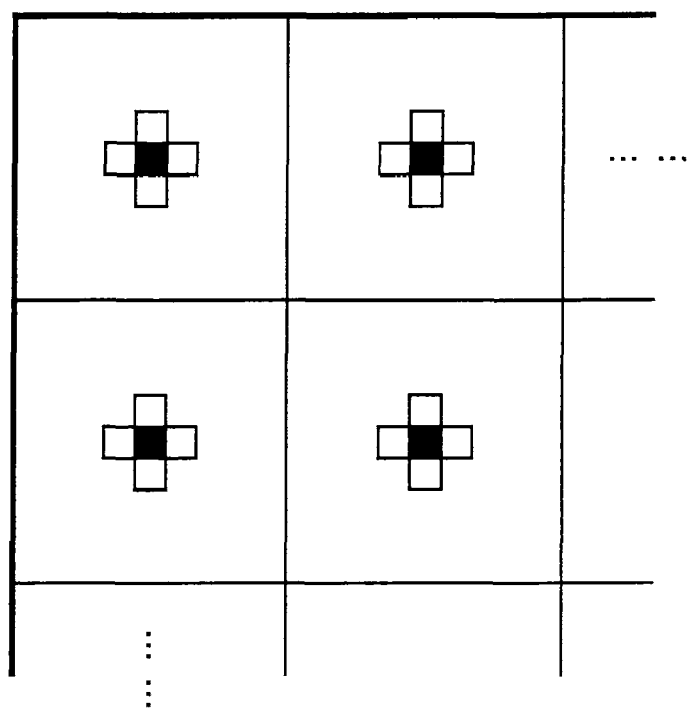
FIG. 14 A diagram for describing the operation of extracting a pixel of interest.

FIG. 14 is a diagram for describing the operation of extracting the pixel of interest. The figure schematically shows that the central pixel (a filled-in square) of each area is extracted as the pixel of interest, and four pixels (open squares) located on the left, right, top and bottom of the pixel of interest are extracted as the adjacent pixels.

The noise filter processing section 162 performs predetermined noise filter processing on the pixel of interest of each area. One example of the noise filter processing is to perform, by reference to the brightness values of the pixel of interest and its adjacent pixels, a weight computation similar to that of the previously described low-pass filter processing. Alternatively, it is possible to read, from the buffer section 163, the brightness value of the pixel of interest in the preceding frame and perform a predetermined weight computation on the brightness values between the pixel of interest in the current frame and the pixel of interest in the preceding frame.

The buffer section 163 stores the brightness value of a pixel of interest included in each area at least until the movement detection processing for the succeeding frame is performed.

The comparison determination section 164 compares the brightness value (that is, the brightness value of the pixel of interest in the current frame) fed from the noise filter section 162 with the brightness value (that is, the brightness value of the pixel of interest in the preceding frame) fed from the buffer section 163 to detect whether or not any movement (change) of the input image of each frame is produced.

The criteria for determining whether or not any change in the brightness value of the pixel of interest is produced are preferably set according to the application of the monitoring device 1'. For example, when it is necessary to detect a minute movement of a monitored subject, unless the brightness values of the pixels of interest in the current and succeeding frames are equal to each other, it is advisable to determine that the brightness value of the pixel of interest varies. When a slight change in the brightness value is considered to be an error, it is advisable to compare and evaluate the brightness values with a predetermined tolerance.

Likewise, the criteria for determining whether or not any movement of an input image is produced are preferably set according to the application of the monitoring device 1'. For example, when it is necessary to accurately detect the movement of a part of a frame, it is advisable to determine, if any change in the brightness value of the pixel of interest in any one of areas is made, that the input image moves. When it is unnecessary to detect movement as accurately as the case described above, it is advisable to determine, only if the brightness values of the pixels of interest in a predetermined number of areas vary, that the input image moves.

With the above-described configuration in which an input image of one frame is divided into a plurality of areas, then the brightness information of each area is acquired and whether or not any movement of the input image is produced is determined by comparing and evaluating the brightness information of the current and preceding frames, it is possible to detect a minute movement of a part of a frame with high accuracy as compared with a conventional method in which movement detection processing is performed based on a frame difference signal.

With the above-described configuration in which the brightness value of the pixel of interest included in each area is used as brightness information, it is possible to reduce the amount of buffered data when the brightness information of the current and preceding frames is compared and evaluated. This helps reduce the size of a circuit.

With the above-described configuration in which a predetermined weight computation is performed on the brightness values between the pixels of interest and its adjacent pixels in the current frame or on the brightness values between the pixels of interest in the current and preceding frames, and the result of the computation is used as the brightness value of the pixel of interest included in each area, the effects of instantaneous brightness change of the pixel of interest are less likely to be suffered. This makes it possible to improve noise resistance and reduce erroneous detection.

With the above-described configuration in which the movement detection processing is performed on an input image by use of the brightness information of each area acquired when a brightness conversion coefficient is calculated, it is possible to simultaneously acquire the brightness information that is required for both the brightness conversion processing and the movement detection processing. This makes it possible to avoid the duplication of a circuit, and this helps reduce the size of the circuit. However, in the application of the present invention, the brightness conversion processing feature is not necessarily essential; the invention can be widely applied to monitoring devices that do not have a section for performing the brightness conversion processing on an input image.

Many modifications and variations are possible without departing from the spirit of the present invention.

Figure 15:
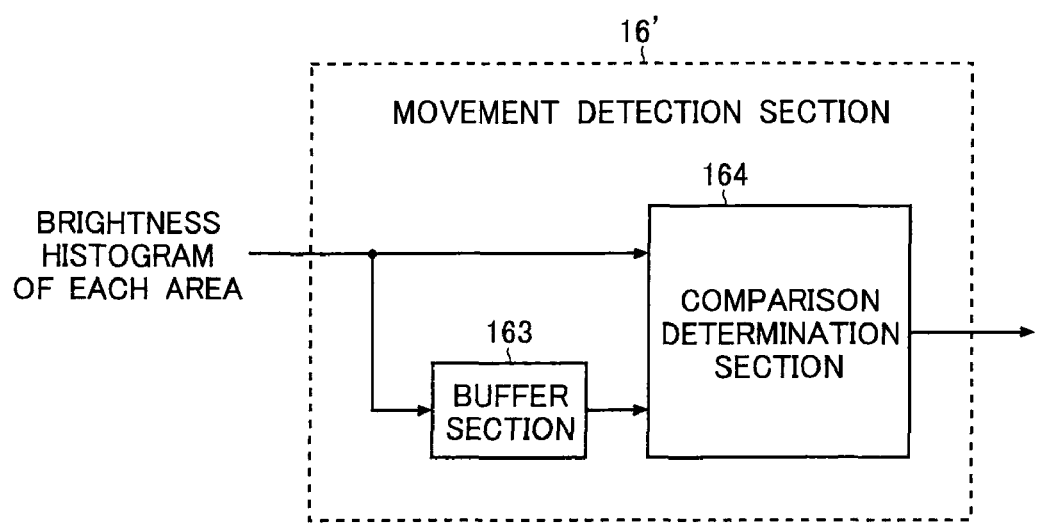
FIG. 15 A block diagram showing another example of the configuration of a movement detection section 16.

Although, for example, the embodiment described above deals with the case where the movement detection is performed based on the brightness value of the pixel of interest included in each area, the present invention is not limited to this configuration. As shown in FIG. 15, whether or not any movement of an input image is produced may be detected by comparing and evaluating the brightness histogram for each area. With this configuration, it is possible to reduce the amount of buffered data when the brightness information of the current and preceding frames is compared and evaluated. This helps reduce the size of a circuit. Moreover, since the effects of noise are less likely to be suffered, it is possible to perform the movement detection of each area with high accuracy as compared with the case where the brightness value of the pixel of interest is compared and evaluated.

Although the embodiment described above deals with the case where the signal detected by the movement detection section 16 is used to control the image recording operation, the present invention is not limited to this configuration. For example, many variations are possible such as one in which the area where movement is detected based on the signal detected by the movement detection section 16 is automatically zoomed in and one in which a warning is given to a monitor.

INDUSTRIAL APPLICABILITY

In an image processing circuit that performs brightness conversion processing on an input image to generate a desired output image, a semiconductor device formed by integrating such an image processing circuit or an image processing device incorporating such a semiconductor device, the technology of the present invention is useful in preventing an increase in the size of a circuit and improving the image quality and visibility of the input image.

In an image processing circuit that detects whether or not any movement (change) of the input image of each frame of moving images is produced, a semiconductor device formed by integrating such an image processing circuit or an image processing device incorporating such a semiconductor device, the technology of the invention is useful in improving detection accuracy and reducing the size of a circuit.

What is claimed is:

1. An image processing circuit arranged to perform brightness conversion processing according to a brightness conversion coefficient on each pixel of an input image and produce an output image, the image processing circuit comprising
    a division section to divide a region of the input image into a plurality of areas; and
    a histogram calculation section to calculate a histogram for each area, and
    a first calculation section to calculate an area-by-area conversion coefficient for each area based on the result from the histogram calculation section,
    wherein the image processing circuit is arranged to determine the brightness conversion coefficient based on a result from the histogram calculation section and based on the area-by-area conversion coefficient,
    the image processing circuit further comprising a filter section arranged to low-pass filter the area-by-area conversion coefficient in terms of images and locations, wherein the filter section is arranged such that when the filtering is performed on an area of interest, the area-by-area conversion coefficient of an area included in a predetermined range around the area of interest is used, and when at least part of the predetermined range is located outside the region of the image, a predetermined imaginary coefficient is assigned to the part and the filtering is performed by regarding the imaginary coefficient as the area-by-area conversion coefficient.

2. An image processing circuit arranged to perform brightness conversion processing according to a brightness conversion coefficient on each pixel of an input image and produce an output image, the image processing circuit comprising:
    a division section to divide a region of the input image into a plurality of areas; and
    a histogram calculation section to calculate a histogram for each area,
    a first calculation section to calculate an area-by-area conversion coefficient for each area based on the result from the histogram calculation section, and
    a second calculation section to calculate a pixel-by-pixel conversion coefficient for each pixel based on the area-by-area conversion coefficient,
    wherein the image processing circuit is arranged to determine the brightness conversion coefficient based on a result from the histoaram calculation section, based on the area-by-area conversion coefficient, and based on the pixel-by-pixel conversion coefficient, and
    wherein the second calculation section is arranged to select, when calculating a pixel-by-pixel conversion coefficient of a particular pixel, four areas in a vicinity of the particular pixel and to perform a bilinear computation on four points located at approximate centers of the four areas.

3. The image processing circuit of claim 1 further comprising:
    a second calculation section to calculate a pixel-by-pixel conversion coefficient for each pixel based on the area-by-area conversion coefficient, the second calculation section arranged to calculate the pixel-by-pixel conversion coefficient so as to further reduce a difference of brightness of a boundary between the areas,
    wherein the image processing circuit is arranged to determine the brightness conversion coefficient based on the pixel-by-pixel conversion coefficient.

4. An image processing circuit arranged to perform brightness conversion processing according to a brightness conversion coefficient on each pixel of an input image and produce an output image, the image processing circuit comprising:
a division section to divide a region of the input image into a plurality of areas; and
a histogram calculation section to calculate a histogram for each area, and
an internal memory,
wherein the image processing circuit is arranged to determine the brightness conversion coefficient based on a result from the histogram calculation section, and
wherein the image processing circuit is arranged so that all pixels included in each area are subjected to predetermined reduction processing and then remaining pixels are counted for the brightness histogram, and a resulting count value except for a few lower-order bits is stored in the internal memory.

5. The image processing circuit of claim 4 arranged so that the reduction processing is performed such that pixels that are eliminated and pixels that are not eliminated are arranged in a staggered manner.

6. An image processing circuit arranged to perform brightness conversion processing according to a brightness conversion coefficient on each pixel of an input image and produce an output image, the image processing circuit comprising:
a division section to divide a region of the input image into a plurality of areas; and
a histogram calculation section to calculate a histogram for each area,
wherein the image processing circuit is arranged to determine the brightness conversion coefficient based on a result from the histogram calculation section, and
wherein image processing circuit is arranged so that when an area that has fewer pixels than a predetermined number of pixels is produced at a time of division of the input image into areas, missing brightness information is supplemented with brightness information of the pixels included in the area and a brightness histogram of the area is acquired.

7. The image processing circuit of claim 6 arranged such that each frame of moving images is picked up as the input image, and the brightness conversion processing for an nth frame is performed according to the brightness conversion coefficient determined based on contents of an (n−1)th frame.

8. The image processing, circuit of claim 6 further comprising:
an image pickup section to form an optical image of a subject to pick up the image of the subject, wherein the input image is obtained by picking up the image.

9. The image processing circuit of claim 6 arranged so that when in the area having fewer pixels than the predetermined number of pixels, a number of missing pixels is less than a number of pixels included in the area, a required number of pixels, among the pixels included in the area, that are closer to a pixel region to be supplemented are extracted, and missing information is supplemented with extracted brightness information.

10. A semiconductor device comprising an image processing circuit according to claim 6.

11. An image processing device comprising:
the semiconductor device of claim 10; and
an image pickup section to form an optical image of a subject to pick up the image of the subject, and arranged to obtain the input image by picking up the image.

12. The image processing device of claim 11, further comprising:
a recording section to record the input image when any movement of the input image is detected.

13. An image processing circuit arranged to perform brightness conversion processing according to a brightness conversion coefficient on each pixel of an input image and produce an output image, the image processing circuit comprising:
a division section to divide a region of the input image into a plurality of areas; and
a histogram calculation section to calculate a histogram for each area,
wherein the image processing circuit is arranged to determine the brightness conversion coefficient based on a result from the histogram calculation section,
the image processing circuit further comprising a movement detection section to acquire brightness information of each of a plurality of areas into which an input image of one frame is divided, and to compare the brightness information of a current frame and a preceding frame to detect whether or not any movement of the input image is produced.

14. The image processing circuit of claim 13, wherein the movement detection section is arranged to use a brightness value of a pixel of interest included in each area as the brightness information.

15. The image processing circuit of claim 14, wherein the movement detection section is arranged to perform a predetermined weight computation on brightness values between a particular pixel and pixels adjacent thereto in the current frame or on brightness values between particular pixels in the current and preceding frames, and to use a result of the computation as the brightness value of the particular pixel included in each area.

16. The image processing circuit of claim 13, wherein the movement detection section is arranged to use a brightness histogram for each area as the brightness information.

17. The image processing circuit of claim 13 further comprising:
a brightness conversion coefficient calculation section to acquire a brightness histogram for each of a plurality of areas into which an input image of one frame is divided, and to calculate a brightness conversion coefficient based on the brightness histogram; and
a brightness conversion processing section to perform brightness conversion processing according to the brightness conversion coefficient on each pixel of the input image,
wherein the movement detection section is arranged to use brightness information of each area acquired when the brightness conversion coefficient is calculated, and to perform movement detection processing on the input image.

18. A semiconductor device comprising an image processing circuit according to claim 13.

19. An image processing device comprising:
the semiconductor device of claim 18; and
an image pickup section to form an optical image of a subject to pick up the image of the subject, and arranged to obtain the input image by picking up the image.

20. The image processing device of claim 19, further comprising:
a recording section to record the input image when any movement of the input image is detected.

* * * * *